United States Patent [19]
Ladstein et al.

[11] Patent Number: 5,770,253
[45] Date of Patent: Jun. 23, 1998

[54] FODDER AND METHOD FOR PRODUCTION OF FODDER CONTAINING LIPIDS OF LOW MELTING TEMPERATURE, IN PARTICULAR FODDER FOR AQUATIC ORGANISMS

[75] Inventors: Kirsti Ladstein, Stavanger; Fred Thorsen, Hundvåg, both of Norway

[73] Assignee: Nutreco Aquaculture Research Centre AS, Forus, Norway

[21] Appl. No.: 596,363
[22] PCT Filed: Sep. 2, 1994
[86] PCT No.: PCT/NO94/00146
§ 371 Date: Mar. 5, 1996
§ 102(e) Date: Mar. 5, 1996
[87] PCT Pub. No.: WO95/07028
PCT Pub. Date: Mar. 16, 1995

[30] Foreign Application Priority Data

Sep. 6, 1993 [NO] Norway .................................. 933160

[51] Int. Cl.$^6$ .............................. A23K 1/18; A23K 1/20
[52] U.S. Cl. ........................ 426/604; 426/601; 426/609; 426/98; 426/99
[58] Field of Search .................................. 426/805, 604, 426/601, 609, 98, 99

[56] References Cited

U.S. PATENT DOCUMENTS 3,129,102  4/1964  Sanders .
4,053,646  10/1977  Wright et al. .

FOREIGN PATENT DOCUMENTS 0 425 213    5/1991   European Pat. Off. .
3-108454     5/1991   Japan .
403290156   12/1991   Japan .................................... 426/805
404158750    6/1992   Japan .................................... 426/805
2 217 175   10/1989   United Kingdom .
2 232 573   12/1990   United Kingdom .

OTHER PUBLICATIONS

D.S.Robinson, "Food–Biochemistry & Nutritional Value," 1987, Longman Group UK Limited, pp. 261–265 & 267–269.
E. Austreng et al, "Effect of Dietary Fat Source on Digestibility of Fat and Fatty Acids in Rainbow Trout and Mink," Acta Agriculture Scandinavica, vol. 29, 1979, pp. 119–126.
J. Sargent et al, "The Lipids" J. E. Halver, Fish Nutrition, Second Addition, 1989, Academic Press, Inc., p. 184.
Johansson et al, "Fat Crystal Networks and Their Strength in Fat Continuous Foods," pp. 81–84. No Date.
Extract from "Filling Fats" (Karlshamns) No date found.
Næringsmiddelindustrien Jan. 1993, pp. 42–44 (w/English Translation).
Mælk –hva ellers! Rapport fra Den 36. Nordiske Meierikongress, Odense 15.–18. Jun. 1992, pp. 90–95 (w/English Translation).
G. Talbot, "Fat Migration in Confectionary Products," reprint from Confectionary Production (1990).
Biscuitine SF, Loders Croklaan (1991).
Galen J. Rokey, "Pet Food & Fish Food," Jun. 1992, Extrusion Cooking, red. Neil Frame.
M.S. Thomassen og C. Røsjø, "Different Fats in Feed for Salmon: Influence on Sensory Parameters, Growth Rate and Fatty Acids in Muscle & Heart," Aquaculture 79 (1989), 129–135.
T. Watanaba, "Lipid Nutrition in Fish," Comp. Biochem. Physiol., vol. 73B, No. 1, 3–15, 1982.
F. Piedad–Pascual, "Effect of Supplemental Lecithin and Lipid Sources on the Growth and Survival of Penaeus Monodon Juveniles" (1986).
M. R. P. Briggs, K. Jauncey, J. H. Brown, Aquaculture 70; (1988) 121–129.
S.M. Polvi, R.G. Ackman, "Atlantic Salmon Muscle Lipids and Their Response to Alternative Dietary Fatty Acid Sources," Journal of Agricultural and Food Chemistry, 1992, 40.
E. Austreng, T. Storebakken, "Practical Formulation of Salmonid Diets with Emphasis on Fat and Protein," Acts of the Norwegian–French Workshop on Aquaculture, Brest Dec. 5–8, 1984, pp. 71–92.
Skretting's Brochure: Fiskefôr 1993 (w/English Translation).

*Primary Examiner*—Deborah Yee
*Attorney, Agent, or Firm*—Palmatier, Sjoquist, Voigt & Christensen, P.A.

[57] ABSTRACT

A fodder contains lipids having a low melting point, especially a fodder for aquatic organisms, wherein the lipids are carried within a crystalline structure formed by other lipids, emulsifiers or a mixture of lipids and emulsifiers. A method for making said fodder, wherein into the lipids firstly is mixed an additive component cooperating with the lipids, and forming a mixture which is at least partly crystalized at the fodder's highest temperature of use and storage. The mixture is added at elevated temperature to porous pellets, and the subsequent cooling brings the mixture into a crystalized state.

6 Claims, No Drawings

FODDER AND METHOD FOR PRODUCTION OF FODDER CONTAINING LIPIDS OF LOW MELTING TEMPERATURE, IN PARTICULAR FODDER FOR AQUATIC ORGANISMS

The invention relates to a fodder containing lipides having a low melting temperature, particularly a fodder for aquatic organisms, and a method for making such a fodder.

Fodder for aquatic organisms such as e.g. fish, is to contain energy, micronutrients and proteins in a proportion varying from species to species. It has been found that salmonids needs a fodder relatively rich on energy. Energy may come from proteins, lipides and hydrocarbons, but lipides are preferred both with regard to nutrition and with regard to fodder economy.

In order to achieve a fodder having a combination of lipides and proteins giving good growth, having the lowest possible raw material price as well as the desired physical properties such as e.g. low sinking speed in water, liquid lipides are supplied to a dry, porous pellet. The lipides are absorbed and kept in the pores of the pellet.

Marine oils have been found to be nutritional favourable. The ordinarily used oils are liquid at normal ambient temperature. Oils leaks out from the pores, and the leakage increases with temperature. The nutritional value is reduced and at the same time, the oil both pollutes and can cause feeding equipment and other farm equipment to malfunction. Leakage of oil may appear even In the manufacturing process and is, thus, also a disadvantage for the feed producer.

Recently, there has been a development towards increasingly more lipid-rich fodder for salmonids. Leakage of oil restricts the amount of lipid having a low melting temperature that the fodder can contain, and this fact has restrained the product development in the field in question. How much oil a pellet can hold depends primarily on the porosity, the nature of the oil and the ambient temperature.

In order to be capable of using the preferred marine oils having a low melting point, the fodder producers have taken several measures in order to prevent leakage. One approach has been to try various solid materials in order to improve the structure and porosity of the dry pellet, thus increasing the ability to absorb oil. The addition of oil has been tried at various stages in the production process, and the production equipment has been modified. Also a thickener such as lecithin has been added the oil. Up to now, none of these measures have reduced leakage of oil to an acceptable level, while still maintaining important fodder properties such as taste, nutritious value and digestibility.

The object of the invention is to provide a fodder containing lipides having a low melting point, at the same time reducing the risk for leakage. Also, an further objective is to provide a method for making such a fodder.

The objectives are achieved through features as defined in the following claims.

In the following, the invention is firstly described in general, and then through three embodiments.

The main principle of the invention is related to the fact that lipides which have a low melting point, i.e. in the form of an oil, are bound in a crystalline structure formed upon the addition of an additive component of lipid nature, and which normally has a higher melting temperature than the oil.

The crystalline structure is stable at temperatures above the normal use and storage temperature of the fodder. The additive+oil is applied in a liquid state at elevated temperature to porous pellets and, following cooling, the crystalized mixture stays, as well demonstrated, within pores in the pellets, but in a solid or jelly-like form. Experiments have shown that lipids having a melting point above fifty degrees Celcius and containg more than five percent fatty acids having twenty carbon atoms or more, are well suited to function as the additive component. Also, good results have been achieved with mono- and di-glyceride emulsifiers, as well as tri- glyceride.

Lipides having a lower melting point remain liquid within the crystalline structure, but it is assumed that a portion of these lipides are included in the crystalline structure as well. Provided that the additive component forms a crystalline structure capable of accommodating the actual lipides, the mixture appears in a solid or jelly-like form at relatively high ambient temperature. In order for the mixture to penetrate well into the porous pellet, it may be necessary to keep both the mixture and the pellet at an elevated temperature for a period. Additive components containing mono-, di-, tri-glyceride seem to give an improved penetration into the pores.

That a crystalized additive component can serve as a carrier for liquid lipides, may be explained by the fact that the additive component forms a crystalline structure consisting of many small crystals rather than a few and large crystals, thus forming many microscopic crystal boundaries with spaces for liquid lipides.

The ability of a crystalized additive component to hold on to oil at a given temperature can be measured by keeping a mixture of oil and additive component in a measuring glass at the actual temperature. A crystalized sediment is formed, carrying a larger or smaller part of the oil, and free oil becomes floating on top of the sediment. After e.g. one day, the level of the sediment, called the crystallization height, and the total height to the liquid surface is read. The proportion between the two levels/heights is a measure of the ability of the additive component to hold on to oil at the actual temperature. Experiments have shown that in order to achieve a satisfactory binding of oil within the fodder, the additive component—at the fodder's highest storage or use temperature—should give a crystallization height (level) corresponding to at least half the total height, when measured as described.

The table below represents measurements of achieved percentage crystallization height with varying concentrations of different additive components in a marine oil at a temperature of forty degrees Celsius.

| Additive component | Concentration in percent | | | | | |
| --- | --- | --- | --- | --- | --- | --- |
| | 1–2 | 2–3 | 3–4 | 4–5 | 6–7 | 8 |
| Tempered rape seed oil (A) | 25 | 75 | — | 85 | — | 95 |
| Mono-glyceride (B) | — | — | 65 | — | 95 | — |
| Mono-di-glyceride (C) | — | 50 | — | 95 | — | — |
| Mixture A + B | 45 | 65 | 95 | 95 | 100 | — |
| Mixture A + C | 50 | 40 | 60 | 100 | 95 | — |

In the table, three additive components are indicated by name and, additionally, denoted through a capital letter A, B and C. Also, measurements from experiments using mixtures of the additive components A and B as well as A and C are recorded. The table shows that a satisfactory binding of oil is achieved, i.e. corresponding to approximately fifty percent crystallization height, when two to four percent of the shown additive components are added into the oil.

In a first example of embodiment of the invention, melted, fully tempered rape seed oil having a melting point of about sixty degrees Celsius is added to marine fish oil.

This corresponds to additive component A in the table. Thus, the additive component as well as the marine oil are lipides. The liquid mixture of tempered rape seed oil and marine fish oil are applied to, and absorbed by, the dry pellet at elevated temperature, so that crystallization does not start before the mixture is absorbed. The capelin oil should have a temperature of at least forty degrees Celsius, in order to achieve a homogenous mixture and in order to avoid that the rape seed oil crystalizes immediately. Crystallization occurs at twenty five to thirty five degrees Celsius, dependent on the cooling speed and the percentage amount of rape seed oil added.

In a second example of embodiment, a mono-glyceride of a saturated vegetable oil was used, the oil having a melting point of about seventy two degrees Celsius. When adding three percent mono-glyceride into marine fish oil, more than fifty percent crystallization height is achieved, such as indicated for additive component B in the table. The mixture is supplied to the porous pellet at elevated temperature as described above.

As a third example of embodiment, it should be mentioned that a mono-di-glyceride lacking a defined melting point and containing about fifty percent mono-glyceride of a vegetable oil, crystalizes together with capelin oil and gives satisfactory crystallization height when the concentration exceed three percent, such as indicated in the table for additive component C. Also this mixture is added to the porous pellet at elevated temperature.

In other respects, experiments have shown that a mixture of tempered rape seed oil and mono-di- and/or tri-glyceride functions well a crystalizing additive components in capelin oil, such as indicated for the mixtures A+B and A+C in the table. When mixing mono-, di-, tri-glyceride into the tempered rape oil, the amount of the latter may be reduced, effecting a better penetration into porous pellets. Additionally, some improvement in the digestibility of the fodder may be expected. No substantial loss of nutritional value, digestibility or palatability of fish fodder made in accordance with the invention has been found, where as leakage and loss of lipides have been greatly reduced.

We claim:

1. A fodder for aquatic organisms, comprising pellets having a crystalline structure formed by a first mixture of lipides and emulsifiers having a high melting point, and further comprising lipides having a lower melting point than said first mixture carried within the crystalline structure.

2. The fodder of claim 1, wherein the crystalline structure further comprises a tempered oil.

3. The fodder of claim 2, wherein the tempered oil further comprises rape seed oil.

4. The fodder of claim 1, wherein the crystalline structure further comprises a lipide taken from the group consisting of mono-glycerides, di-glycerides and tri-glycerides.

5. The fodder of claim 1, wherein the crystalline structure further comprises a mixture of a tempered oil and a lipide taken from the group consisting of mono-glycerides, di-glycerides, and tri-glycerides.

6. A method for making fodder for aquatic organisms for use and storage in a temperature range of use, comprising the steps of forming a pellet having a crystalline structure at the highest temperature in said temperature range of use, from a first mixture of lipides having a high melting point and an additive component; heating said pellet to a temperature above the melting point of a second mixture of lipides and additives having a low melting point; absorbing said second mixture into the crystalline structure of said first mixture; and cooling said pellet to a temperature within said temperature range of use.

* * * * *